United States Patent
Grim et al.

(10) Patent No.: US 9,531,702 B2
(45) Date of Patent: *Dec. 27, 2016

(54) TWO-FACTOR AUTHENTICATION SYSTEMS AND METHODS

(71) Applicant: salesforce.com, inc., San Francisco, CA (US)

(72) Inventors: Evan Tyler Grim, Austin, TX (US); Josh Alexander, Austin, TX (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/940,868

(22) Filed: Nov. 13, 2015

(65) Prior Publication Data

US 2016/0080348 A1    Mar. 17, 2016

Related U.S. Application Data

(63) Continuation of application No. 14/071,637, filed on Nov. 4, 2013, now Pat. No. 9,210,150, which is a
(Continued)

(51) Int. Cl.
*H04L 29/06* (2006.01)
*H04W 12/06* (2009.01)

(52) U.S. Cl.
CPC ............. *H04L 63/08* (2013.01); *H04W 12/06* (2013.01); *H04L 63/0861* (2013.01); *H04L 63/107* (2013.01); *H04L 2463/082* (2013.01)

(58) Field of Classification Search
CPC .................................................. H04L 63/0861
(Continued)

(56) References Cited

U.S. PATENT DOCUMENTS 5,963,646 A    10/1999    Fielder et al.
5,995,624 A    11/1999    Fielder et al.
(Continued)

FOREIGN PATENT DOCUMENTS

EP    1816821    8/2007
JP    2007-042103    2/2007
(Continued)

OTHER PUBLICATIONS

Notice of Allowance in U.S. Appl. No. 13/660,976 mailed Jul. 5, 2013, 14 pages.
(Continued)

*Primary Examiner* — Longbit Chai
(74) *Attorney, Agent, or Firm* — Meyertons, Hood, Kivlin, Kowert & Goetzel, P.C.

(57) ABSTRACT

Systems and methods for authenticating defined user actions over a computer network. An authentication service receives an authentication request from an authenticating service to perform an action on behalf of a user. The authentication service then sends a permission request to a mobile device associated with the user, asking the user whether or not the action should be allowed. The user sends a permission response via the mobile device to the authentication service, granting or denying the action. The user may automate future similar responses so long as at least one automation criterion is met (e.g., the physical location of the mobile device), eliminating the need to manually provide a response to future permission requests. Information necessary to determine whether the automation criterion is met is stored locally on the mobile device.

23 Claims, 4 Drawing Sheets

Related U.S. Application Data continuation-in-part of application No. 13/660,976, filed on Oct. 25, 2012, now Pat. No. 8,578,454.

(60) Provisional application No. 61/551,370, filed on Oct. 25, 2011, provisional application No. 61/609,824, filed on Mar. 12, 2012, provisional application No. 61/693,690, filed on Aug. 27, 2012, provisional application No. 61/878,537, filed on Sep. 16, 2013.

(58) Field of Classification Search
USPC .......................................................... 726/4
See application file for complete search history.

(56) References Cited

U.S. PATENT DOCUMENTS

| | | |
|---|---|---|
| 6,049,612 A | 4/2000 | Fielder et al. |
| 6,105,133 A | 8/2000 | Fielder et al. |
| 7,104,444 B2 | 9/2006 | Suzuki |
| 7,548,886 B2 | 6/2009 | Kirkland et al. |
| 7,669,760 B1 | 3/2010 | Zettner |
| 7,801,304 B1 | 9/2010 | Harvey et al. |
| 7,805,749 B1 | 9/2010 | Harvey et al. |
| 7,860,131 B1 | 12/2010 | Harvey et al. |
| 7,908,638 B1 | 3/2011 | Harvey et al. |
| 2003/0182194 A1 | 9/2003 | Choey et al. |
| 2006/0136334 A1 | 6/2006 | Atkinson et al. |
| 2007/0055878 A1 | 3/2007 | Sandhu et al. |
| 2007/0174082 A1 | 7/2007 | Singh |
| 2010/0006642 A1 | 1/2010 | Boutcher et al. |
| 2010/0100454 A1 | 4/2010 | Sines et al. |
| 2010/0174649 A1 | 7/2010 | Bouchard |
| 2010/0217880 A1 | 8/2010 | Venezia et al. |
| 2010/0293598 A1 | 11/2010 | Collart et al. |
| 2010/0299529 A1 | 11/2010 | Fielder |
| 2011/0142234 A1 | 6/2011 | Rogers |
| 2011/0202466 A1 | 8/2011 | Carter |
| 2011/0307699 A1 | 12/2011 | Fielder |
| 2011/0307705 A1 | 12/2011 | Fielder |
| 2011/0307706 A1 | 12/2011 | Fielder |
| 2011/0307707 A1 | 12/2011 | Fielder |
| 2011/0314281 A1 | 12/2011 | Fielder |
| 2012/0144468 A1* | 6/2012 | Pratt ...................... G06F 21/40 726/7 |
| 2012/0158821 A1* | 6/2012 | Barros .............. G06F 17/30563 709/203 |
| 2012/0280784 A1 | 11/2012 | Gaviria Velez et al. |

FOREIGN PATENT DOCUMENTS

| | | |
|---|---|---|
| JP | 2009-151790 | 7/2009 |
| KR | 10-2002-0038681 | 5/2002 |
| KR | 10-0814561 | 3/2008 |
| WO | 2009/140333 | 11/2009 |
| WO | 2010/043722 | 4/2010 |

OTHER PUBLICATIONS

Office Action in U.S. Appl. No. 14/071,637 mailed Mar. 2, 2015, 8 pages.

Notice of Allowance in U.S. Appl. No. 14/071,637 mailed Jul. 27, 2015.

International Search Report and Written Opinion of International Application No. PCT/US2012/061999 mailed Feb. 13, 2013, 10 pages.

International Preliminary Report of International Application No. PCT/US2012/061999 mailed Apr. 29, 2014, 5 pages.

Extended European Search Report in Application No. 12843520.3 mailed Jan. 23, 2015, 6 pages.

Office Action in European Application No. 12843520.3 mailed Jun. 29, 2016, 6 pages.

Tanaka Toshiaki, et al., "Examining Agent Authentication and Authorization Scheme Regarding ITS." No. 61 (late 2000), National Conference Papers (3), Japan, Information Processing Society of Japan, Oct. 3, 2000, 3F-7, pp. 3-243-3-244.

Office Action in Japanese Application No. 2014-539022 mailed Feb. 25, 2016, 20 pages.

Office Action in European Application No. 12843520.3 mailed Dec. 2, 2015, 4 pages.

\* cited by examiner

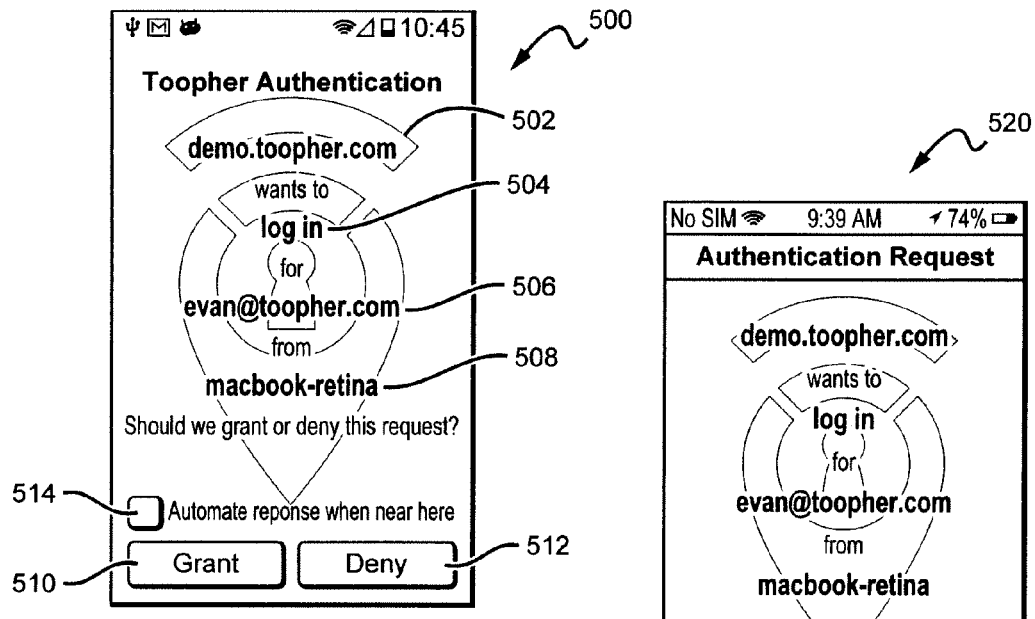
FIG. 5a
FIG. 5b
FIG. 6
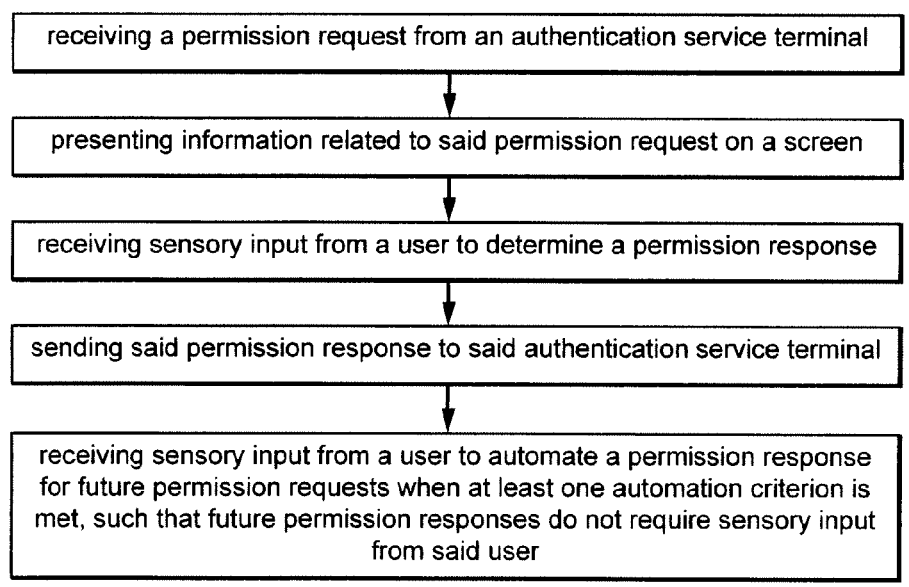

TWO-FACTOR AUTHENTICATION SYSTEMS AND METHODS

This application is a continuation of U.S. application Ser. No. 14/071,637, filed Nov. 4, 2013, which is a continuation-in-part of U.S. application Ser. No. 13/660,976, filed Oct. 25, 2012 (now U.S. Pat. No. 8,578,454), which claims priority to U.S. Provisional Appl. No. 61/693,690, filed Aug. 27, 2012, U.S. Provisional Appl. No. 61/609,824, filed Mar. 12, 2012, and U.S. Provisional Appl. No. 61/551,370 filed on Oct. 25, 2011. The '637 application also claims the benefit of U.S. Provisional Appl. No. 61/878,537, filed Sep. 16, 2013. The disclosures of each of the above-referenced applications are incorporated by reference herein in their entireties.

BACKGROUND OF THE INVENTION

Field of the Invention

Embodiments of the present invention relate to systems and methods of authentication, and more specifically, to such systems and methods using geo-location tools in mobile devices.

Description of the Related Art

The security community has long sought a viable second factor to supplement and fortify passwords as a means for user authentication. Previous attempts have been hamstrung by solutions that are too expensive and cumbersome to enjoy mainstream adoption.

Much to the chagrin of the security community, passwords have stubbornly remained the only authentication mechanism in place for the vast majority of user accounts. This is largely due to the simplicity and ease of use that passwords provide account holders. However, when used as the sole factor for authentication, passwords present a litany of issues: they are often either hard to remember or easy to guess; users tend to reuse their passwords with many accounts; they are often stored insecurely both at the client and the server . . . the list goes on and on. The consensus has long held that there is a compelling need for an additional mechanism that can supplement and fortify this irksome first factor. A multitude of solutions have been proposed over the years, all promising to provide this much needed second factor—but for various reasons none have found widespread adoption beyond a relatively small niche user-base. The larger world of mainstream users remains unprotected and would greatly benefit from a solution that does not extensively affect existing authentication routines.

Recently, some two-factor authentication (TFA) mechanisms have been used; however, none of these known solutions are ideal. Many TFA mechanisms in current use center around the use of a security token. In this scheme, users are issued a token, often a small hardware device with a screen which displays a seemingly random number that changes periodically. Users that have paired a token with a network resource must supply the number currently on the screen at any given moment as part of the login procedure (in addition to a static password, the first authentication factor). If the provided code matches an expected value at a token-aware backend for a given instance, then the system grants the authentication request—feeling confident that a request that can provide a password (something known) and a valid code from the token screen (something possessed) is reasonably likely to be an authentic request. Security schemes using hardware tokens have been relatively successful as a two-factor authentication mechanism; however these schemes have been limited almost exclusively to environments where use is mandated (e.g., required for login to a corporate VPN, etc.). The lack of widespread adoption outside these mandatory use environments may be attributable to two primary barriers to entry: the significant infrastructure required to implement such systems (e.g., complicated backend servers, hardware costs, etc.); and the inconvenience to a user in having to retrieve a token and transcribe a code every time a login is required.

More recent solutions have mitigated some of the daunting infrastructure requirements, such as the TFA mechanisms deployed by companies such as Facebook and Google. These kind of mechanisms provide software based tokens that reside on the mobile devices that many of their users already carry on their person. However, these systems still require the user to retrieve his/her mobile device, launch the required application, and transcribe the code currently displayed on the mobile device screen. Many users find this solution to be cumbersome and irritating.

Some other recent solutions use location awareness of a mobile device as a part of a larger authentication process; however, these approaches require the transmission of a user's location or other identifying information to a central server. This raises privacy concerns for users where large amounts of personal data (e.g., daily travel habits) are stored on a third party server where the data may not be secure.

Other location based approaches require a priori or on-demand location awareness for terminal devices attempting the authentication.

Thus, there is a need for a system that achieves TFA without significantly burdening the user while, at the same, time eliminating the need for complicated infrastructure implementations.

SUMMARY OF THE INVENTION

One embodiment of a method of authentication comprises the following steps. A permission request is sent to at least one mobile device associated with a user to grant or deny permission to perform an action. The user is enabled to select a feature to automate a grant/deny response for the permission request, eliminating the need for the user to manually respond to future permission requests for the action, wherein the future permission requests meet at least one automation criterion.

BRIEF DESCRIPTION OF THE DRAWINGS

FIGS. 5a and 5b show screen shots from a mobile authenticating device.

FIG. 6 shows a flow chart of operations that may be performed by a mobile device for authenticating a permission request.

DESCRIPTION OF THE INVENTION

Figure 1:
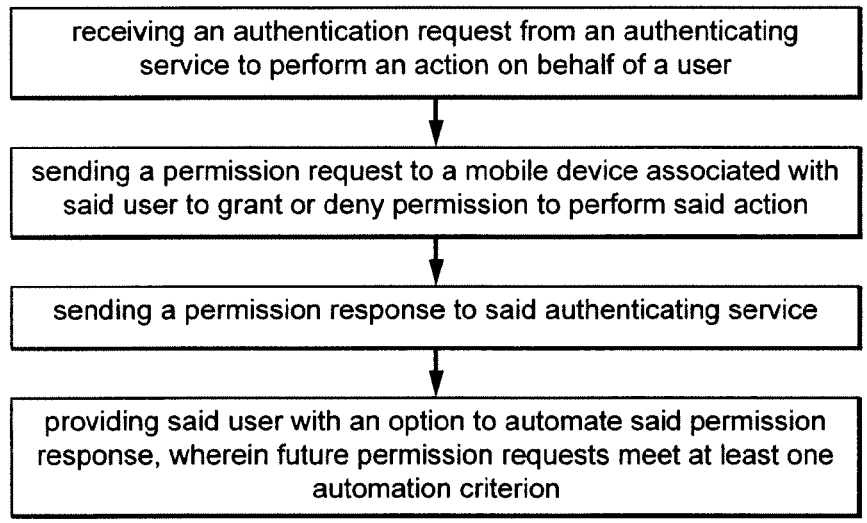
FIG. 1 is flow chart of a method of authentication.

Embodiments of the invention can be implemented in numerous ways, including as a method, a process, an apparatus, a system, a composition of matter, a computer readable medium such as a computer readable storage medium or a computer network wherein program instructions are sent over optical or communication links. A component such as a processor or a memory described as being configured to perform a task includes both general components that are temporarily configured to perform the task at a given time and/or specific components that are manufactured to perform the task. In general, the order of the steps of disclosed methods or processes may be altered within the scope of the invention.

A detailed description of one or more embodiments of the invention is provided below along with accompanying figures that illustrate the principles of operation. Embodiments of the invention are described with particularity, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various aspects will now be described in connection with exemplary embodiments, including certain aspects described in terms of sequences of actions that can be performed by elements of a computer system. For example, it will be recognized that in each of the embodiments, the various actions can be performed by specialized circuits, circuitry (e.g., discrete and/or integrated logic gates interconnected to perform a specialized function), program instructions executed by one or more processors, or by any combination. Thus, the various aspects can be embodied in many different forms, and all such forms are contemplated to be within the scope of what is described. The instructions of a computer program for authenticating a user action can be embodied in any computer-readable medium for use by or in connection with an instruction execution system, apparatus, or device, such as a computer based system, processor containing system, or other system that can fetch the instructions from a computer-readable medium, apparatus, or device and execute the instructions.

As used herein, a "computer-readable medium" can be any means that can contain, store, communicate, propagate, or transport a program for use by or in connection with an instruction execution system, apparatus, or device. The computer-readable medium can be, for example but is not limited to, an electronic, magnetic, optical, electromagnetic, infrared, or semiconductor system, apparatus, device, or propagation medium. More specific examples of the computer readable-medium can include the following: an electrical connection having one or more wires, a portable computer diskette or compact disc read only memory (CD-ROM), a random access memory (RAM), a read only memory (ROM), an erasable programmable read only memory (EPROM or Flash memory), and an optical fiber. Other types of computer-readable media are also contemplated.

Embodiments of the present invention provide systems and methods that provide authentication and/or authorization of defined user actions. This is done by leveraging the network connectivity and location awareness of modern mobile devices (such as smartphones, tablet computers, etc.) to provide an automated and unobtrusive authentication factor, which is typically a second factor of authentication to be used in conjunction with a first factor, for example a username/password login combination.

FIG. 1 is flow chart of a method of authentication according to an embodiment of the present invention. An authentication service receives an authentication request from an authenticating service to perform an action on behalf of a user. The authentication service then sends a permission request to a mobile device associated with the user, asking the user whether or not he wishes to perform the action. The user sends a permission response via the mobile device to the authentication service, granting or denying the action. The user is provided with an option to automate future similar responses so long as at least one automation criterion is met (e.g., the physical location of the mobile device), eliminating the need to manually provide a response to future permission requests. Information necessary to determine whether the automation criterion is met is stored locally on the mobile device.

When an authenticating service (e.g., a web site that requires a login or a car security computer) needs to authenticate a user action, an authentication request is sent to an authentication service. If the authentication request has been sent out by an authenticating service, then ostensibly a first authentication factor has already been provided. In the case of a web site, the first factor is normally a username/password combination. In the example of a car security system, the first authentication factor might be a signal from a key. The authentication method shown in FIG. 1 provides a streamlined process for providing a second factor of authentication to augment the security provided by the first factor. The above-referenced authenticating services are exemplary. Indeed, throughout the specification reference is made to the action of logging on to an exemplary web service; however, it is understood that this is merely one action that may be authenticated using embodiments of the present invention as discussed in more detail herein.

One way in which the process is streamlined is by eliminating the need for repeated authentication grant/deny permission responses by the user. Embodiments of the present invention achieve this by utilizing location awareness technology, a capability that most modern mobile devices already include. Location awareness provides one way to further automate the authentication process and eliminates the need for repeated grant/deny actions, allowing the user's mobile device to remain stowed away in a pocket, a purse, or on a docking station near the user, for example.

This is possible because there is an intuitive pairing between an action, such as logging on to a service for example, and the physical location from which the action is initiated. For instance, a user will typically check his email using a given device from a small subset of places (e.g., home, work, the local coffee shop). When the user attempts to login from a known device when he is at one of these locations, the probability that it is a valid request significantly increases. Thus, these permission responses from familiar locations can be automated by using the authentication application to "teach" the mobile device which types of requests should be automated. Stated differently, the user's mobile device "learns" which authentication requests to automate so that the user does not have to repeatedly perform a grant/deny action to send a permission response.

The learning process can be implemented in several ways. For example, the learning process can be as simple as asking the user if a given authentication request should be automated, or it can involve some additional automation mechanisms to streamline the user experience. For example, the mobile device could be put into a learning mode that automatically grants the authentication requests it receives and stores the locations where the requests were received. The learning process can be implemented in many other ways as well. Once authenticating service, location, and mobile device have been associated (i.e., learned) the system can automatically respond when a similar request is presented in the future without prompting the user for any additional action. The method/system provides a quick and easy way for automation of a robust and unobtrusive second authentication factor.

Figure 2:
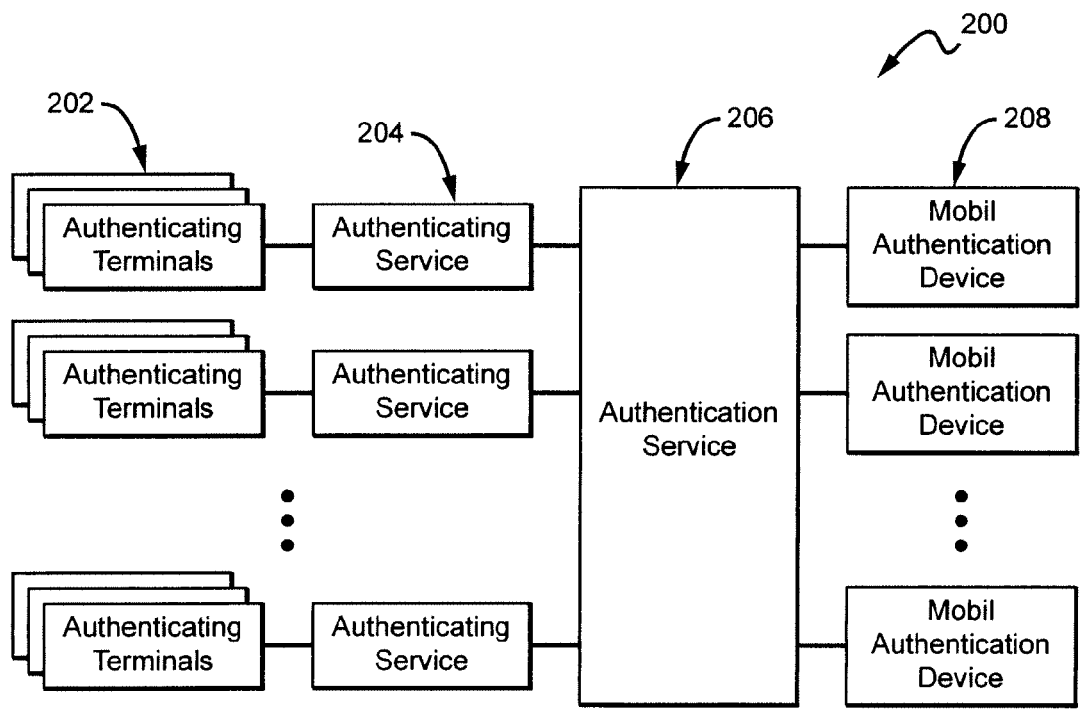
FIG. 2 is a diagram showing an authentication system.

FIG. 2 is a diagram showing an authentication system 200 comprising components according to embodiments of the present invention. A user uses several authenticating terminals 202 (e.g., a home computer, a work computer, a laptop at the coffee shop) to access an authenticating service 204 (e.g., a third party website). Here, a first authentication factor (e.g., a password) is communicated from an authenticating terminal 202 to the authenticating service 204. The authenticating service 204 communicates with the authentication service 206 to verify a user action. This is done by sending a permission request to a mobile authentication device 208 associated with the user. The user uses the mobile device 208 to send a permission response to the authentication service 206 which is passed along to the authenticating service 204, providing the second factor of authentication. Future permission responses may be automated via the mobile device 208. Each of the authenticating terminals 202, the authenticating services 204, and the mobile devices 208 are assigned a universally unique identifier (UUID) that is used to identify it within the authentication service 206.

Embodiments of the methods and systems utilize two key actions: pairing and authentication.

Paring

In order for a mobile authentication device 208 to authenticate an authenticating service 204, the two first need to be paired together. The pairing process includes the communication of any information that is required for subsequent authentication requests to succeed. For example, if the authenticating service 204 wishes to require one-time-passwords (OTP) to validate authentication requests, the pairing process will establish a shared secret (analogous to an encryption key) between the mobile authentication device 208 and the authenticating service 204. When a subsequent authentication request is made, the mobile authentication device 208 will use this shared secret to generate the OTP, and the authentication will use it to verify that the OTP is correct. The pairing process may require additional information as well (e.g., cryptographical keys, digital signature information, etc.). The pairing process also establishes a unique identifier for the pairing that will be included in future authentication requests. Mobile devices 208 may be configured to discard authentication requests that do not contain a known, valid pairing identifier.

Figure 3A:
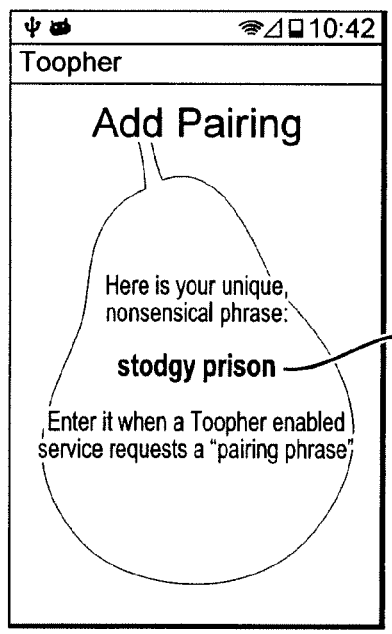
FIGS. 3a-c show a series of screen shots from an exemplary mobile authenticating device.
Figure 3B:
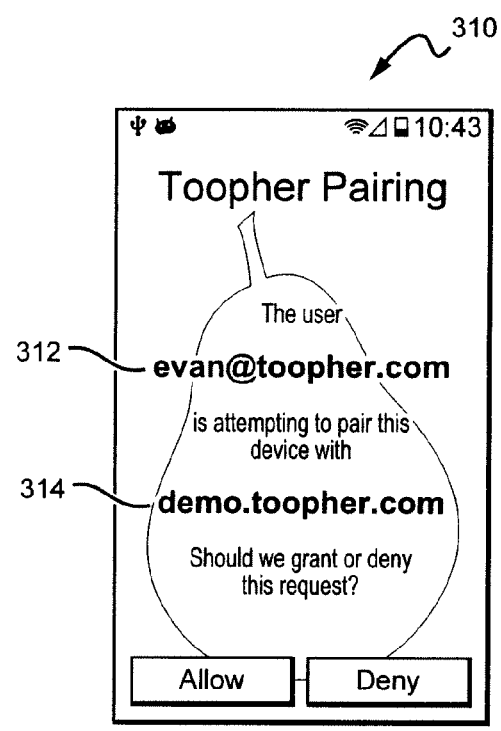
Figure 3C:
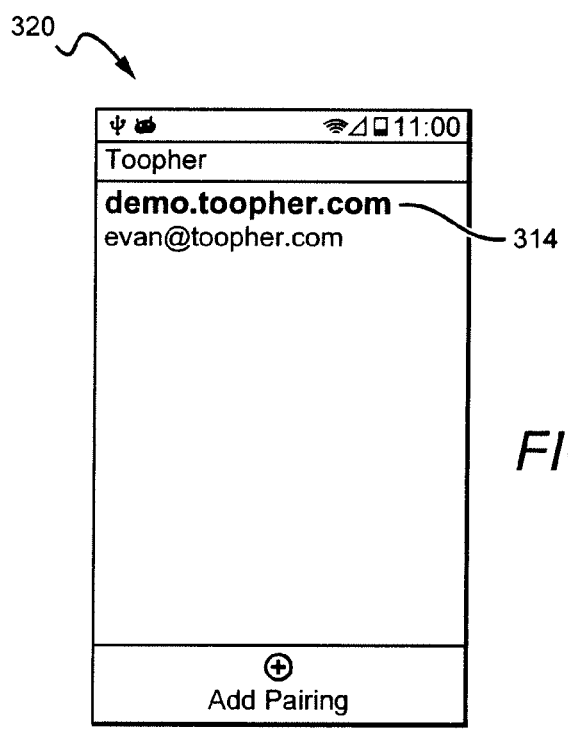

FIGS. 3a-c show a series of screen shots 300, 310, 320 from an exemplary mobile authenticating device 208 running an application of the authentication service 206 an Android operating system. In FIG. 3a, the screen shot 300 shows a pairing phrase 302 which has been generated by the mobile device 208. The pairing phrase is then entered by the user at the authenticating terminal 202. Then the authentication service 206 pushes a pairing request to the mobile device 208 as shown in the screen shot 310 in FIG. 3b. The pairing request includes the user name 312 and the authenticating service name 314 so that the user has the information necessary to verify the pairing before granting it. The screen shot 320 in FIG. 3c shows that the mobile device 208 has successfully paired with the authenticating service 204. The authenticating service name 314 now appears in the paired service list.

Figure 4A:
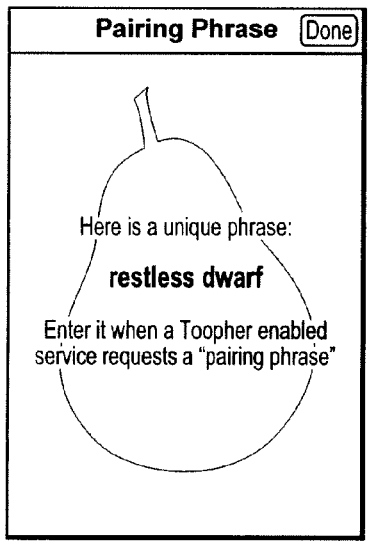
FIGS. 4a-c show a series of screen shots from an exemplary mobile authenticating device.
Figure 4B:
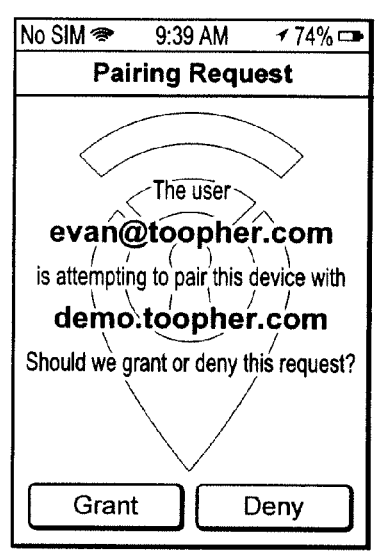
Figure 4C:
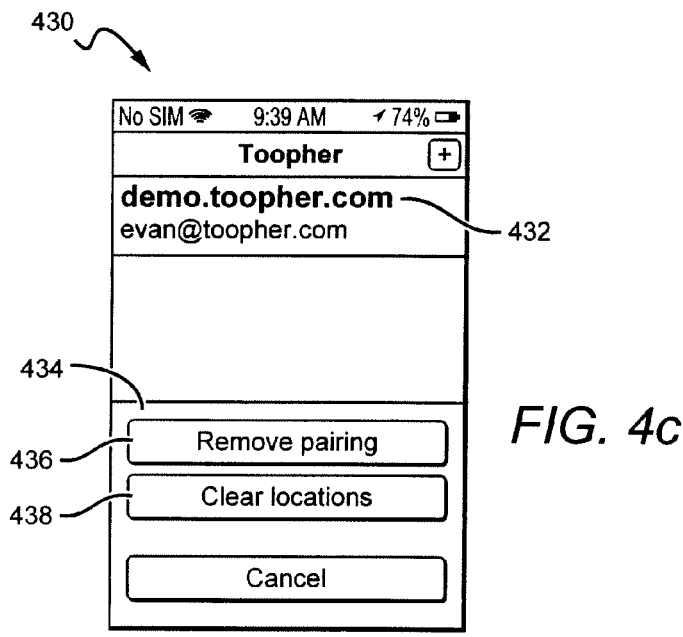

FIGS. 4a-c shows a similar set of screen shots 410, 412, 414 exemplifying the pairing process on an mobile device 208 running an application of the authentication service 206 on an iOS platform. FIG. 4c shows the paired service list where the authenticating service name 432 has been selected. The pop-up dialogue box 434 allows the user to un-pair the mobile device 208 from the authenticating service 204 with the "Remove pairing" button 436 or to clear the pairing list entirely with the "Clear locations" button 438.

Authentication/Authorization

It is understood that the term "authentication" as used herein may also mean authorization in the sense that some action is authorized by an authenticated user response (e.g., a bank transfer), whether manual or automated. Thus, when the term "authentication" is used alone it may also refer to "authentication/authorization."

Authentication/authorization is a primary purpose of the methods and systems disclosed herein. After a mobile device 208 has been paired with an authenticating service 206, the actual authentication occurs whenever the authenticating service 206 wishes to verify an action to be performed by a user. This will typically involve receiving an authentication request to do an action at which point the authenticating service 206 must verify the authenticity of the request before communicating to the authenticating service 204 that it is permitted to perform the action. As one possible example, a user may use his laptop to attempt to log in to a web-based email service. Here, the laptop is the authenticating terminal 202 and the web-based email service is the authenticating service 204. The authenticating service 204 will likely, but not necessarily, require the user to present some kind of first factor authenticating information (e.g., a password). Using embodiments of methods and systems disclosed herein, the authenticating service 204 is providing the user with an additional second factor for authentication, and so it then initiates an authentication request through the authentication service 206 and provides the appropriate pairing identifier for the user that is attempting authentication. The authentication service 206 sends a permission request to the appropriate mobile authentication device 208 that responds with permission response as outlined herein.

As previously noted, the permission response can be generated automatically or manually.

In the automated response mode, the mobile authentication device 208 checks an internal database and determines if the authentication request matches at least one automation criterion. There are many options for selecting the criteria for automation, and the mechanism can allow for an authenticating service 204 to flexibly specify an automation policy. In one exemplary embodiment, the authenticating service 204 will allow the user to specify that a certain type of permission request should automatically generate a grant/deny permission response when the mobile authentication device is within a certain proximity of a stored location, and an authentication request is received indicating that it is coming from the same terminal identifier used to originally store that location. This represents an intuitive pairing between the terminals 202 used to log in to an authenticating service 204 and the location of the mobile authentication device 208 when the authentication request is made. If automation is possible, the instruction (grant or deny) is encapsulated in a permission response which is sent to the authentication service 206. This response can optionally include a currently valid OTP to further verify the mobile device 208, along with traditional encryption and digital signature mechanisms.

Additionally, if the request automation latency is critical, the mobile authentication device 208 can pre-seed the permission response when the state of the automation criterion changes to allow the authentication service to respond appropriately without necessarily being required to contact the mobile device on-demand. For example, the criterion automation state can change when the mobile device enters or exits geographic regions where the permission response has been automated. This particular kind of pre-seeding method is known as "geo-fencing." Many other methods may be used to pre-seed an automated permission response.

If the permission request does not match a known automation database entry, the permission response may default to denial, or the mobile device 208 can simply prompt the user for manual entry of the permission response.

Manual generation of the permission response may be used when automation cannot be achieved (e.g., a bad location signal) or is otherwise undesirable. If this is the case, the user will be prompted for the permission response. In addition to requesting the permission response, embodiments of the present invention also include the ability for the user to indicate that similar future requests should receive the same authentication decision (as described above) at the same time the user is prompted for the permission response.

FIGS. 5a and 5b show screen shots 500, 520 of a mobile device 208 presenting a permission request that requires entry of a manual permission response. The screen shot 500 shows a permission request displayed on mobile device 208 that is running an Android operating system. In this embodiment, the permission request includes a designator of the authenticating service 502, an action description 504, a user name 506, and a terminal description 508. Having been presented with the relevant information to inform an authentication decision, the user may either grant or deny the permission request using the corresponding buttons 510, 512. If the user would like to automate generation of the permission response to similar future permission requests without prompting the user to grant or deny the automate response button 514 may be selected. If automation is activated, the automation database is updated with the location of the mobile authentication device 208 at the time of the permission request which may be used to generate future permission responses.

FIG. 6 shows a flow chart of operations that may be performed by the mobile device 208 for authenticating a permission request according to embodiments of the present invention. The mobile device receives a permission request from an authentication service 206. Information related to the permission request is presented to the user. The information may be presented visually on a screen, audibly by text-to-voice applications, or by other methods. The mobile device 208 is configured to receive sensory input from the user to determine the permission response. Sensory input includes tactile input (e.g., pushing a button), verbal input, or kinds of input. The mobile device 208 then sends the permission response to the authentication service 206. The mobile device 208 also is configured to receive sensory input from the user to automate the permission response as discussed herein.

As previously noted, the exemplary methods and systems discussed herein have focused on login actions to a web site. However, the authentication methods and systems described can be applied to any situation where access or actions need to be authenticated over a computer network. For example, an embodiment of one method can improve vehicular security by using the location awareness of the vehicle itself and including it as a component in an authentication request. The mobile device will not grant the permission request unless it and the vehicle are in close proximity to each other. Another embodiment can include transaction verification, such as providing a means for credit card processors to verify all or a subset of credit card transactions.

Furthermore, physical access controls can be augmented by only allowing access if a paired mobile device is in proximity to the point of entry. Such access controls can further be improved by using this method as a means for authorization, where one or more additional paired devices must approve a request for entry to be granted, for example, a maintenance worker attempting to enter a plant floor may request entry along with a work order, which is transmitted to a plant manager's mobile device for explicit approval before access is granted.

The methods and systems of authentication described herein may also be paired with other more secure factors of authentication. For example, a biometric authentication factor (e.g., a retinal scan, a fingerprint, a voice profile, etc.) may be required in concert with a permission response from the mobile device for those applications requiring heightened security, such as military field operations. Security increases exponentially with each added layer of authentication.

Gesture Based Authentication/Authorization

Additional factors can be achieved using a gesture to authenticate and/or authorize an action on at least one mobile device at the application level to enable automated authentication/authorization responses on any channel accessible by the at least one mobile device. For example, in one embodiment a challenge (i.e., a permission request) is sent to a mobile device, which requires the user to respond to the request. Upon granting or denying the challenge, the application asks the user of the mobile device for an application-level gesture-based response to authenticate/authorize the response to the challenge. This gesture-based authentication/authorization signs the response going forward as at least one of the factors for automated responses, such that the user is no longer required to respond for authentications/authorizations in the future.

Many different gesture-based responses are possible. The gesture may involve physical interaction with the mobile device(s), whether through contact or contextual information via the mobile device including but not limited to touching the mobile device(s), interacting with the optical or aural sensors (e.g., cameras, microphones), and interacting with movement sensors (e.g., the accelerometer). Other methods of interacting with the mobile device are also possible, depending on the available hardware for a given mobile device.

Contextual Responses Through SMS Channels

Some embodiments of the present invention transmit and display contextual information and data through the short message service (SMS) channel to at least one mobile device to aid in the authentication/authorization process and using contextual information from said mobile device(s) to create an automated authentication/authorization process in the future. This information can include, but is not limited to, a user's identity, an action, a service, a web service, a network, an application, a location, a time, a date, at least one device identity, at least one device location, an IP address, and/or any combination thereof. Through the transmission and display of this information and data, users may make better decisions. Embodiments of the present invention allow a user to depend on this information and data and then transmit a response back through the SMS channel, thereby creating an out-of-band authentication/authorization process.

In one embodiment, a challenge is sent to a mobile device through the SMS channel, which requires a user to respond to the request. Upon transmission of the challenge, contextual information and data is sent via the SMS channel and displayed on at least one mobile device. This contextual information and data may include (but is not limited to) user identity, action, web service, and the requesting device identity. The user then depends on this information to make a decision as to whether or not the request is valid, authentic, genuine, legitimate, and/or accurate. Upon deciding based on the transmission and display of this information and data through the SMS channel on at least one mobile device, the user may respond to the challenge through the SMS channel and/or use the additional one-time password to respond through an in-band channel.

Additionally, relying on contextual information available to at least one mobile device, the user may opt to automate this response, based on the information and data transmitted through the SMS channel and displayed on at least one mobile device. Using this contextual information, which may include (but is not limited to) the location of at least one mobile device, Bluetooth stations, wifi stations, NFC stations, radio stations, RFID stations, ambient sound, ambient light, biometric information, kinetic stations (e.g., information gathered/processed through at least one accelerometer), time, temperature, barometer, or altimeter, thereby allowing at least one mobile device to respond automatically to similar responses in the future and not requiring the user to respond to similar requests in the future.

Centralized Administration of Hosted and/or on Premise Authentication/Authorization Services Embodiments of the present invention may use a centralized administrator to manage hosted and/or on premise authentication and authorization services. This centralized administration applies to either or both the user-level administration of hosted and/or on premise authentication/authorization services and/or client-level administration of hosted and/or on premise authentication/authorization services. This centralized administration enables either or both users to manage all aspects of the functionality and features of their accounts. On the user-side of the administration, users may manage any and all accounts they have previously paired. Additionally, users may add pairings to their account from this centralized administration. On the authenticating service system side of the administration, service systems may add/remove services through which their users may pair, as well as the addition, provisioning, and/or deletion of users.

For example, in one embodiment a user may log into the centralized administration portal to change contextual information setting to their account. In another example, a service system may log into the centralized administration portal to add a user to its service.

Authentication/Authorization Via Push Notification Channel from an on-Premise Location In another embodiment of the present invention authentication/authorization challenges may be sent over the push notification channel from an on-premise installation. An on-premise installation may include, for example, a virtual machine installation or a non-virtual machine installation. The characteristic common to on-premise installations is that they do not utilize hosted deployments and often involve physical installations at an authenticating service system site.

For example, in one embodiment a user may attempt to log into a VPN by sending credentials through a browser. The credentials are relayed from the browser to the authenticating service system. Upon verification of the credentials, the service system sends a request to an on-premise solution (instead of a hosted solution), at which point the on-premise solution challenges the user via an out-of-band authentication request. The user manually or automatically responds to the challenge, and the response is sent back to the on-premise installation. The on-premise solution then sends the response back to the authenticating service system. With that data, the authenticating service system can decide whether or not to allow the user access.

Aggregation and Use of Results Derived from Data Generated by Authentication/Authorization Requests In another embodiment of the present invention, through the course of sending and receiving authentication/authorization requests, proprietary data may be aggregated related to users, clients, sessions, actions, transactions, and/or any contextual information associated with the challenges and the responses to said challenges.

For example, in one embodiment a user may attempt to login into a VPN by sending credentials through a browser. The credentials are relayed from the browser to the authenticating service system. Upon verification of the credentials, the service system sends a request to an on-premise solution (instead of a hosted solution), at which point the on-premise solution challenges the user via an out-of-band authentication request. The user manually or automatically responds to the challenge, and the response is sent back to the on-premise installation. The on-premise solution then sends the response back to the authenticating service system. With that data, the service system can decide whether or not to allow the user access. The data from these transactions can then be aggregated and used. Examples of the data to be aggregated include: the value of the response (yes/no); the method of response (automated/manual); the context (time, date, location, terminal ID, etc.); the service (site ID, network ID, etc.); and the action (login, logout, transfer, purchase, submission, etc.). The above data are merely exemplary. It is understood that any data generated by these transactions can be aggregated and used for many different purpose.

The Automatic Transition/Upgrade from OTP Parings

Embodiments of the present invention provide the ability to pair with both naked OATH (Initiative for Open Authentication) enabled authentication processes and the more sophisticated authentication processes described herein. It is possible to transition and/or upgrade a naked OATH pairing to a pairing without involving the user, only the acceptance of the authenticating service or network. As a result, it is possible to seamlessly and invisibly, and with minimal friction to the user, transition and/or upgrade OATH pairings to other authentication systems that are not pure naked OATH one-time password (OTP) generators, which specifically require a user to input a one-time password manually.

In one embodiment, a user connects the authentication service to a website that does not support anything more than naked OATH OTPs. The website then decides to support one or more authentication services that are not pure naked OATH OTP generators. The user can now use all functionality of the authentication service at the next authentication instance with little or no interaction with the web service or application.

Building, Using, Marketing, and Selling Modules for Integrated Identity Access Management, Single Sign On, and Access Policy Management Solutions with Out-Of-Band Multifactor Authentication/Authorization Embodiments of the present invention provide for the construction, use, and marketing of multifactor authentication/authorization modules to integrate with identity access management, single sign on, and access policy management solutions using out-of-band processes on at least one mobile device.

In one embodiment, an enterprise connects the authentication service to the Ping Federate IAM solution as the authentication solution for the platform. The construction of this or any other similar out-of-band multifactor authentication/authorization integrations regardless of solution(s) provider.

Software Development Kits for Out-of-Band Multifactor Authentication/Authorization Embodiments of the present invention allow for the construction, use, and/or marketing of multifactor authentication/authorization modules to integrate with third party application clients using out-of-band processes on the at least one mobile device. For example, an enterprise can embed the authentication service software development kit (SDK) into its proprietary mobile application for the use of out-of-band, multifactor authentication/authorization processes with their web service(s). Embodiments of the present invention provide the ability to build, deploy, and market out-of-band multifactor authentication/authorization solutions via SDK for the use of integration into third-party applications.

The Use of Biometrics to Authenticate/Authorize

Embodiments of the present invention can use biometric information to authenticate/authorize (i.e., sign) an authentication/authorization request via at least one mobile device. This biometric information may include, but is not limited to: fingerprints, facial recognition, voice recognition, retinal scans, palm prints, vein patterns in the hand and/or eye, the way the user moves, the way the user thinks, the way the user breathes, the way the user moves blood through their body, for example. Any other identifying biometric characteristics may be used to complete an authentication/authorization request from a particular user. Biometric information can also be used in combinations (e.g., voice recognition plus fingerprint) to add additional layers of security.

Many different other types of information that are unique to or strongly indicative of a particular user may be used to complete authentication/authorization requests. For example, the behavior of the user in real or virtual environments may be used as identifying information in the authentication process.

In one embodiment, an authentication request is sent from an authenticating party to the user. The user approves this authentication request by scanning their fingerprint on the at least one mobile device. Thus, embodiments of the invention support the ability to sign or approve an out-of-band multifactor authentication/authorization request using biometric or other information, including the ability to use various pieces of information in combination.

The Use of at Least One Mobile Device to Authenticate/Authorize Automated or Non-Automated Access to a Vehicle The use of at least one mobile device to provide automated or non-automated authentication/authorization to access a vehicle (i.e., the action). The at least one mobile device described herein includes but is not limited to phones, wearables (e.g., watches, glasses, etc.), tablets, laptops, and other mobile hardware. Vehicles which may be accessed include but are not limited to cars, trucks, sports utility vehicles, motorcycles, recreational vehicles, aircraft, boats, ships, hovercrafts, and spacecraft. In this particular exemplary application, the action to be authorized is permitting access to a vehicle using at least one mobile device via communication channels, including but not limited to SMS, push, telephony, Bluetooth, NFC, RFID, wifi, optical and any and other channels of mobile device communication.

In one embodiment, a user approaches her vehicle and as either the primary, secondary, or $n^{th}$ factor for authentication/authorization, an authentication/authorization request is sent to at least one mobile device to allow access to the vehicle using the processes described herein.

The Use of at Least One Mobile Device to Authenticate and/or Authorize Automated and/or Non-Automated Start to a Vehicle (Ignition)

In another embodiment, the system can be used to provide automated or non-automated authentication/authorization to start a vehicle ignition (i.e., the action). For example, a user can approaches his vehicle and as either the primary, secondary, or $n^{th}$ factor for authentication/authorization, an authentication/authorization request is sent to at least one mobile device to authorize ignition for the vehicle.

The Use of at Least One Mobile Device to Authenticate/Authorized Automated or Non-Automated Processes at a Fuel Pump.

Embodiments of the present invention allow for the use of at least one mobile device to provide automated or non-automated authentication/authorization to access a fuel pump (i.e., the action). For example, a user approaches a fuel pump and as either the primary, secondary, or $n^{th}$ factor for authentication/authorization, a request is sent to at least one mobile device to authenticate/authorize access to the fuel pump.

The Use of at Least One Mobile Device to Authenticate/Authorize Automated or Non-Automated Acess to a Physical Location In another embodiment, the at least one mobile device can be used to provide automated or non-automated authentication/authorization to access a physical location (i.e., the action), such as doors, hallways, rooms, sensitive compartmented information facilities (SCIFs), elevators, escalators, buildings, residences, industrial spaces, government facilities, dormitories, grain elevators, laboratories, and many other kinds of places. A user approaches a door and as either the primary, secondary, or $n^{th}$ factor for authentication/authorization, a request is sent to the at least one mobile device to authenticate/authorize access to the physical location.

The Use of at Least One Mobile Device to Authenticate/Authorized Automated or Non-Automated Processes at an Automated Teller Machine (ATM).

In another embodiment, the at least one mobile device can be used to provide automated or non-automated authentication/authorization to access an ATM (i.e., the action). For example, a user approaches an ATM and as either the primary, secondary, or $n^{th}$ factor for authentication/authorization, a request is sent to the at least one mobile device to authenticate/authorize access to the ATM.

The Use of a Third-Party Solution to Provide Velocity Throttling Services Via at Least One Mobile Device In another embodiment, the system can be used to provide velocity-throttling services to a third party (i.e., the action). This capability enhances the automated authentication/authorization via the at least one mobile device by allowing additional contextual information, in this case, time and/or timing, to determine whether a response should be issued via at least one mobile device. For example, in the case where a user attempts to perform an action (e.g., log in to a website) repeatedly, the frequency of the login attempts triggers contextual awareness of the at least one mobile device, and the mobile device returns affected responses as per the context of the action attempts.

The Use of an Automated Authentication/Authorization Data to Improve Risk-Based Systems In another embodiment, the system can be used to provide automated authentication/authorization requests and corresponding results or data to improve the quality and results of risk-based systems (i.e., the action). Risk-based systems include but are not limited to risk engines, algorithms, anomaly detection systems, intrusion detection systems, and various other systems designed to determine whether an action is considered valid within a prescribed set of parameters. For example, a user logs into a website via an automated authentication request and the corresponding data from that authentication request is logged into a risk-based system to improve the sample volume and quality of future results. Alternatively, a fraudster attempts to log into a website which triggers an authentication response, and the true user automates a "deny" response going forward. This response is logged into the risk-engine for future rules and/or parameters to improve the quality of future results.

The Use of Contextual Information on at Least One Mobile Device to Aid in an Account Recovery Process Embodiments of the present invention can use contextual information from the at least one mobile device to aid various processes, such as an account recovery process, for example. Contextual information includes but is not limited to the following (individually or in combination) location data, location awareness, wifi stations, Bluetooth stations, NFC stations, radio stations, RFID stations, biometrics, noise, ambient light, kinetics, accelerometer data, time, temperature, barometer, and altimeter. Other contextual clues can also be used. For example, a user wants to recover her account and in the process of doing so, contextual information from the at least one mobile device is used to add integrity, certainty, security, and/or expediency to the process.

The Use of Contextual Information from the at Least One Mobile Device to Aid in the Paring Process Systems according to embodiments of the present invention can utilize contextual information from the at least one mobile device to aid in the pairing process. For example, a user wants to pair his account with an additional authentication/authorization service and in the process of doing so, contextual information from the at least one mobile device is used to add integrity, certainty, security, and/or expediency to the process.

The Use of Contextual Information on the at Least One Mobile Device to Improve the Certificate Authority (CA), SSL/TLS Certificates, and the Web Certificate Process Embodiments of the present invention provide for the use of contextual information on the at least one mobile device to improve the process by which the CA issues certificates for secure communication between a web browser and a web server. For example, when the user wants to securely interact via web browser with a server using a certificate, the contextual information from at least one mobile device is used to add integrity, certainty, security, and/or expediency to the process.

Several actions requiring authentication/authorization have been described herein. It is understood that these actions are merely exemplary and that the methods, devices, and systems according to embodiments of the present invention can be used to authenticate/authorize many different kinds of actions.

Embodiments of the subject matter described in this specification can be implemented in a computing system that includes a back end component, e.g., a data server, or that includes a middleware component, e.g., an application server, or that includes a front end component, e.g., a client computer having a graphical user interface or a web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Furthermore, the flow charts depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

We claim:

1. A non-transitory computer-readable medium having computer instructions stored thereon that are capable of causing a mobile device to perform operations comprising:
transmitting login information for a user of the mobile device to an authorization system and receiving confirmation of a login of the user to a user account;
while the user is logged in to the user account, receiving a first permission request from the authorization system to perform an action related to the user account;
causing display of a message that permits a user to select whether to automate a response for future permission requests if at least one automation criterion is satisfied;
receiving first user input responsive to the message;
after receiving the first user input, receiving a second permission request from the authorization system while the user is logged in to the user account, wherein the second permission request is to perform an action related to the user account;
determining that the at least one automation criterion is met for the second permission request; and
in response to the determining, automatically responding to the second permission request based on the first user input without requesting additional user input indicating whether to grant or deny the second permission request.

2. The non-transitory computer-readable medium of claim 1, wherein the action related to the user account corresponding to the second permission request is a payment transaction.

3. The non-transitory computer-readable medium of claim 1, wherein the authorization system is an authenticating service or an authentication service.

4. The non-transitory computer-readable medium of claim 1, wherein the at least one automation criterion includes a criterion that is based on a geographic location of the mobile device.

5. The non-transitory computer-readable medium of claim 1, wherein the at least one automation criterion includes a criterion that is based on one or more of: biometric information associated with the user, voice recognition of the user, or a gesture performed by the user.

6. The non-transitory computer-readable medium of claim 1, wherein the action requested by the second permission request is the same action as the action requested by the first permission request.

7. The non-transitory computer-readable medium of claim 1, wherein the action corresponding to the second permission request is initiated via a computing device that is different than the mobile device.

8. The non-transitory computer-readable medium of claim 1, wherein the action corresponding to the second permission request is to unlock or start a vehicle.

9. The non-transitory computer-readable medium of claim 1, wherein the at least one automation criterion includes that the first permission request and the second permission request each specify the same: service, account, action, and device requesting the action.

10. A mobile device, comprising:
at least one antenna;
one or more processing elements coupled to the at least one antenna;
one or more memories having program instructions stored thereon that are capable of causing the mobile device to:
transmit login information for a user of the mobile device to an authorization system and receive confirmation of a login of the user to a user account;
while the user is logged in to the user account, receive a first permission request to perform an action related to the user account from the authorization system;
cause display of a message that permits a user to select whether to automate a response for future permission requests if at least one automation criterion is satisfied;
receive first user input responsive to the message;
after receiving the first user input, receive a second permission request from the authorization system while the user is logged in to the user account, wherein the second permission request is to perform an action related to the user account;
determine that the at least one automation criterion is met for the second permission request; and
in response to the determination, automatically respond to the second permission request based on the first user input without requesting additional user input indicating whether to grant or deny the second permission request.

11. The mobile device of claim 10, wherein the action corresponding to the second permission request is a financial transaction.

12. The mobile device of claim 11, wherein the financial transaction is a payment transaction.

13. The mobile device of claim 10, wherein the at least one automation criterion includes a criterion that is based on a location of the mobile device.

14. The mobile device of claim 10, wherein the action requested by the second permission request is a different action than the action requested by the first permission request.

15. The mobile device of claim 10, wherein the at least one automation criterion includes that the first permission request and the second permission request each specify the same: authorization service, user account, action, and device requesting the action.

16. The mobile device of claim 10, wherein the action corresponding to the second permission request is initiated via a computing device that is different than the mobile device.

17. A method, comprising:
a mobile computing device transmitting login information for a user of the mobile computing device to an authorization system and receiving confirmation of a login of the user to a user account from the authorization system;
while the user is logged in to the user account on the device, the device receiving a first permission request to perform an action related to the user account from the authorization system;
the device causing display of a message that permits a user to select whether to automate a response for future permission requests if at least one automation criterion is satisfied;
the device receiving first user input responsive to the message;
after receiving the first user input, the device receiving a second permission request from the authorization system while the user is logged in to the user account, wherein the second permission request is to perform an action related to the user account;
the device determining that the at least one automation criterion is met for the second permission request; and
in response to the determining, the device automatically responding to the second permission request based on the first user input without requesting additional user input indicating whether to grant or deny the second permission request.

18. The method of claim 17, wherein the action related to the user account corresponding to the second permission request is a financial transaction.

19. The method of claim 17, wherein the at least one automation criterion includes a criterion that is based on a location of the mobile device.

20. The method of claim 17, wherein the at least one automation criterion includes that the first permission request and the second permission request each specify the same: service, account, and action.

21. A method, comprising:
receiving, by an authorization computing system, login information for a user from a mobile device;

transmitting, by the authorization computing system, a confirmation of login to a user account for the user to the mobile device;

sending, by the authorization computing system, a first permission request to perform an action to the mobile device, while the user is logged in to the user account, wherein the mobile device includes a memory having stored thereon instructions that are capable of causing the mobile device to display a message that permits a user to select whether to automate a response for future permission requests if at least one automation criterion is satisfied;

sending, by the authorization computing system, a second permission request to perform an action to the mobile device, while the user is logged in to the user account; and receiving, by the authorization computing system, an automated response to the second permission request from the mobile device, wherein the automated response is sent without requesting additional user input indicating whether to grant or deny the second permission request.

22. The method of claim 21, wherein the action corresponding to the second permission request is a financial transaction.

23. The method of claim 21, wherein the at least one automation criterion includes a criterion that is based on a geographic location of the mobile device.

* * * * *